US008329851B2

(12) United States Patent
Zhang et al.

(10) Patent No.: US 8,329,851 B2
(45) Date of Patent: Dec. 11, 2012

(54) FUNCTIONAL POLYMER WITH A PENDANT COLOR CHANGING INDICATOR

(75) Inventors: Yifan Zhang, Woodbury, MN (US); Yi He, Roseville, MN (US); Diane R. Wolk, Woodbury, MN (US); Mark W. Nelson, Lino Lakes, MN (US); Larry Richard Krepski, St. Paul, MN (US); Stephen Richard Hartshorn, St. Paul, MN (US); Douglas Eugene Weiss, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 117 days.

(21) Appl. No.: 12/666,796

(22) PCT Filed: Jun. 27, 2008

(86) PCT No.: PCT/US2008/068480
§ 371 (c)(1),
(2), (4) Date: Dec. 2, 2010

(87) PCT Pub. No.: WO2009/006254
PCT Pub. Date: Jan. 8, 2009

(65) Prior Publication Data
US 2011/0077358 A1  Mar. 31, 2011

Related U.S. Application Data

(60) Provisional application No. 60/947,030, filed on Jun. 29, 2007.

(51) Int. Cl.
C08G 65/00 (2006.01)
C08G 14/00 (2006.01)
C08K 5/07 (2006.01)
C08L 61/00 (2006.01)
C08F 283/00 (2006.01)
C08B 1/00 (2006.01)

(52) U.S. Cl. ............. 528/93; 525/153; 525/471; 536/56
(58) Field of Classification Search .................. 528/93
See application file for complete search history.

(56) References Cited

U.S. PATENT DOCUMENTS

| | | | |
|---|---|---|---|
| 1,975,504 A | 10/1934 | Formhals | |
| 2,263,387 A | 11/1941 | Houk et al. | |
| 3,165,375 A | 1/1965 | Tesoro | |
| 3,338,992 A | 8/1967 | Kinney | |
| 3,642,972 A | 2/1972 | Needles et al. | |
| 3,812,181 A | 5/1974 | Leimgruber et al. | |
| 3,825,380 A | 7/1974 | Harding et al. | |
| 4,118,531 A | 10/1978 | Hauser | |
| 4,287,153 A | 9/1981 | Townsend | |
| 4,729,371 A | 3/1988 | Krueger et al. | |
| 4,988,560 A | 1/1991 | Meyer et al. | |
| 5,176,952 A | 1/1993 | Joseph et al. | |
| 5,207,970 A | 5/1993 | Joseph et al. | |
| 5,232,770 A | 8/1993 | Joseph | |
| 5,238,733 A | 8/1993 | Joseph et al. | |
| 5,258,220 A | 11/1993 | Joseph | |
| 5,462,991 A | 10/1995 | Roboti et al. | |
| 6,183,670 B1 | 2/2001 | Torobin et al. | |
| 6,269,513 B1 | 8/2001 | Torobin | |
| 6,315,806 B1 | 11/2001 | Torobin et al. | |
| 6,501,002 B1 | 12/2002 | Roe et al. | |
| 6,646,026 B2 | 11/2003 | Fan et al. | |
| 6,703,243 B1 * | 3/2004 | Baars et al. | ............. 436/86 |
| 6,753,454 B1 | 6/2004 | Smith et al. | |
| 7,070,640 B2 | 7/2006 | Chung et al. | |
| 2004/0059044 A1 | 3/2004 | Olson et al. | |
| 2005/0250168 A1 | 11/2005 | Gonzalez et al. | |
| 2006/0134613 A1 | 6/2006 | Martin et al. | |
| 2010/0197027 A1 | 8/2010 | Zhang et al. | |

FOREIGN PATENT DOCUMENTS

| | | |
|---|---|---|
| DE | 4334949 A1 | 5/1994 |
| DE | 19507950 A1 | 8/1996 |
| EP | 1314802 A | 5/2003 |
| EP | 1 703 015 A1 | 9/2006 |
| GB | 767341 | 1/1957 |
| GB | 829869 A | 3/1960 |
| GB | 1075743 A | 7/1967 |
| GB | 1405701 A | 9/1975 |
| JP | 05-320616 A | 12/1993 |
| WO | WO 01/17356 A1 | 3/2001 |
| WO | WO 2004/101870 | 11/2004 |
| WO | WO 2005042771 A2 * | 5/2005 |
| WO | WO 2005/061764 | 7/2005 |
| WO | WO 2005/114184 A2 | 12/2005 |
| WO | WO 2007/078873 A1 | 7/2007 |
| WO | WO 2008/138726 A2 | 11/2008 |
| WO | WO 2009/006131 | 1/2009 |
| WO | WO 2009/006254 | 1/2009 |

OTHER PUBLICATIONS

Database WPI Week 199403 *Thomas Scientific*, London, GB; AN 1994-018656; XP002501007.
C.N. Davies, "The Separation of Airborne Dust and Particles", Institution of Mechanical Engineers, London Proceedings 1B, 1952.
Hark et al., "Synthetic Studies of Novel Ninhydrin Analogs", Canadian Journal of Chemistry 79, pp. 1632-1654 (2001).
Li et al., "Electrospun Polylactic Acid Nanofiber Membranes as Substrates for Biosensor Assemblies", Journal of Membrane Science 279, pp. 354-363, (2006).
Roesler et al., "Tris-3-(1-aziridino) propionates and their use in formulated products", Progress in Organic Coatings, vol. 50, pp. 1-27 (2004).

(Continued)

Primary Examiner — Peter F Godenschwager
Assistant Examiner — David Karst
(74) Attorney, Agent, or Firm — Steven E. Skolnick

(57) ABSTRACT

A functionalized polymer is disclosed that comprises the reaction product of a polymer having one or more pendant reactive functional groups and a color changing indictor having a co-reactive functional group. The co-reactive functional group of the color changing is able to react with the reactive functional group of the polymer to form a covalent bond. Therefore, the color changing indicator is pendant from the polymer. The color changing indicator maintains its ability to produce a visually discernable color change in the presence of an associated stimulus.

20 Claims, No Drawings

OTHER PUBLICATIONS

PCT International Search Report for PCT/US2008/068094, Date of Mailing: Mar. 11, 2008.
PCT International Search Report for PCT/US2008/068480; Date of Mailing: Oct. 24, 2008.
U.S. Appl. No. 60/966,560, filed Jun. 29, 2007; Titled: Indicating Fiber.
U.S. Appl. No. 12/666,047, filed Dec. 22, 2009; Titled: Indicating Fiber.
Hills, Inc., Production of sub-micro fibers in non-woven fabrics, 2003, retrieved from internet site: http://replay.waybackmachine.org/20030421103603/http:/www.hillsinc.net/submicron%20.shtml.
Morris, J.R. et al., NFN—An Improved Ninhydrin Reagent for Detection of Latent Fingerprints, 1974, Police Research Bulletin, No. 24, pp. 45-53.

* cited by examiner

FUNCTIONAL POLYMER WITH A PENDANT COLOR CHANGING INDICATOR

CROSS REFERENCE TO RELATED APPLICATIONS

This application is a national stage filing under 35 U.S.C. 371 of PCT/US 2008/068480, filed Jun. 27, 2008, which claims priority to U.S. Provisional Application No. 60/947,030, filed Jun. 29, 2007, the disclosure of which is incorporated by reference in its/their entirety herein.

FIELD

The present disclosure relates to a functionalized polymer for producing a color change in the presence of a stimulus.

BACKGROUND

Color changing indicators are used to provide a visually discernable indication as to the presence of a particular stimulus. For example, ninhydrin (1,2,3-triketo-hydrindene hydrate) is a color changing indicator. Ninhydrin has been recognized as a reagent for detecting amino acids, amines and amino sugars. When reacting with amines, a deep blue or purple product called Ruhemann's Purple forms. The reaction from ninhydrin to the conjugate Ruhemann's Purple is shown below:

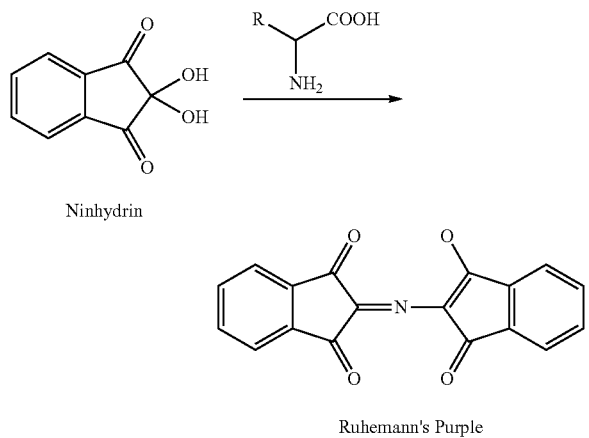

Ninhydrin

Ruhemann's Purple

A color changing indicator may be directly exposed to a surface containing an associated stimulus. However, with direct exposure to a surface, the color changing indicator that has changed color on the surface may remain on the surface and cause staining damage to the surface.

SUMMARY

A color changing indicator is one or more chemical compounds that will interact with a stimulus to produce a visually discernable color change. The color change may be visible under ordinary visible light conditions or may be visible outside of visible light conditions, such as under UV conditions. For example, some color changing indicators will cause florescence that in only visible under UV light. One example of a color changing indicator is ninhydrin. Ninhydrin reacts in the presence of proteins, amino acids, amines, and amino sugars to produce a color change.

Chemically bonding a color changing indicator to a polymer can produce a polymer that is capable of producing a color change in the presence of a stimulus. For film-forming or fiber-forming polymers, films or fibers can be formed that will produce a color change in the presence of a stimulus. However, because the color changing indicator is bonded to the polymer, the color changing indicator is not released on to the surface containing the stimulus. Therefore, remaining is a functional color changing indicator that is immobilized to the framework of the polymer.

A functionalized polymer is disclosed that comprises the reaction product of a polymer having one or more pendant reactive functional groups and a color changing indictor having a co-reactive functional group. The co-reactive functional group of the color changing is able to react with the reactive functional group of the polymer to form a covalent bond. Therefore, the color changing indicator is pendant from the polymer. The color changing indicator maintains its ability to produce a visually discernable color change in the presence of an associated stimulus. In one embodiment, the color changing indicator is a functionalized ninhydrin. In one embodiment, the reactive functional group of the polymer is a hydroxyl group. In one embodiment, the reactive functional group of the polymer is an aziridine group. In one embodiment, the co-reactive functional group of the ninhydrin is a carboxylic acid. In one embodiment, the pendant reactive functional group is covalently bonded to the polymer. In one embodiment, the pendant reactive functional group is entangled at a molecular level within the polymer.

In one embodiment, a film or a fiber is formed from the functional polymer with the pendant color changing indicator. In one embodiment, a nonwoven article is form from the fibers which comprises the functional polymer with the pendant color changing indicator.

In one embodiment, a film-forming or fiber-forming polymer includes a pendant aziridine group. The pendant aziridine group may function as the reactive functional group for bonding with a co-reactive functional group of a color changing indicator.

DETAILED DESCRIPTION

A color changing indicator may be exposed to a surface containing an associated stimulus, which is capable of producing a color change with the indicator, to produce a color change and give an indication as to the presence or absence of a substance on a surface. The stimulus may be pH, protein, amine, sugar including glucose, or hemoglobin/myoglobin to give a reaction for the particular color-changing indicator. For example, if the color changing indicator responds to amino groups, then the color changing indicator will respond to meat-based protein. Protein is present in meat. Meat products such as beef can carry *E. coli* and chicken can carry *Salmonella*. Therefore, a color-changing indicator that responds to an amino group may indicate a meat or meat residue is present and contaminations such as *E. coli* or *Salmonella* may be present.

A functionalized color changing indicator pendant from a polymer allows for the color changing indicator to be exposed to the stimulus, and immobilizes the color changing indicator onto the polymer. If the polymer is in the form of a substrate, then even after exposure of the color changing indicator to the stimulus, the color changing indicator remains immobilized on the substrate and limits or prevents staining of the surface containing the stimulus.

Examples of color changing indicators include genipin, fluorescein, coomassie blue, and ninhydrin. Ninhydrin is one example of a color changing indicator that can produce a color change in the presence of a protein. Therefore, by reaction with the protein present in meat, the ninhydrin may indicate the presence of *E. coli* or *Salmonella*.

A functionalized polymer is disclosed that comprises the reaction product of a polymer having one or more pendant reactive functional groups and a color changing indicator having a co-reactive functional group. The co-reactive functional group of the color changing indicator is able to react with the reactive functional group of the polymer to form a covalent bond. Therefore, the color changing indicator is pendant from the polymer. The color changing indicator maintains its ability to produce a visually discernable color-change in the presence of an associated stimulus. In particular, a functionalized polymer with a pendant ninhydrin is disclosed.

I. Polymer and Reactive Functional Group

The polymer includes a reactive functional group. In particular, the polymer includes a reactive functional group that is pendant from the polymer and is therefore available for reacting with a co-reactive functional group on the color changing indicator. In one embodiment, the polymer includes a reactive functional group covalently bonded to the polymer. In another embodiment, the reactive functional group component is entangled at a molecular level within the framework of the polymer.

As shown below, the polymer includes a covalently bonded reactive functional group Y. Also, the polymer is generically depicted because the polymer may be something other than simply a straight carbon chain.

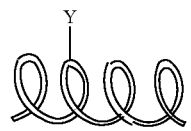

A linking group $L_1$ may be included and positioned between the polymer and the functional group Y. Shown below is the polymer with a linking group $L_1$ and functional group Y.

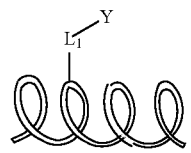

As shown below, is another embodiment where a component containing the reactive functional group, Y, is entangled at a molecular level within the framework of the polymer. The component containing the reactive function group Y may itself be a polymer, it may be an oligomer, or a monomer. An optional linking group, $L_1$, is also shown. In this embodiment, the reactive functional group Y is not covalently bonded to the polymer. However, the reactive functional group is entangled at a molecular level within the polymer network such that it will be considered to be a part of the polymer, pendant from the polymer, contained within the polymer, bonded to the polymer, or otherwise chemically associated with the polymer for purposes of this disclosure.

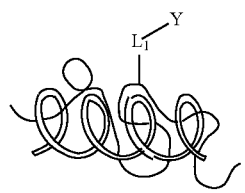

Functional group Y is any reactive functional group that can readily react with the co-reactive functional group Z associated with the color changing indicator. In one embodiment, the reactive functional group is aziridine, and therefore the polymer is an aziridine-containing polymer. Aziridine is a functional group that can readily react with functional groups, such as a carboxylic acid group under mild conditions without additional reagents. An aziridine-containing polymer is depicted below, where $R_1$ and $R_2$ are independently H or $C_1$-$C_4$ alkyl groups, and $L_1$ is an optional linking group between the aziridine group and the polymer backbone. Again, the polymer is generically depicted because the polymer may be something other than simply a straight carbon chain.

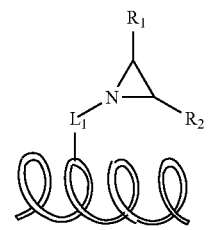

A variety of methods can be used to arrive at an aziridine-containing polymer. One example of creating an aziridine-containing polymer involves reacting a polymer with a suitable nucleophile, such as hydroxyl, amine, carboxyl group, with a compound that includes two or more aziridine-containing functional groups. The polymer may inherently have the nucleophile it like polyester, or can be modified by plasma treatment or corona treatment to contain a nucleophile. The reaction will result in one of the aziridine functional group bonding with the nucleophile of the polymer and one or more unreacted aziridine group(s) pendant from the polymer. The unreacted aziridine group forms the reactive group Y that can then react with co-reactive group Z on the color changing indicator, as will be discussed in more detail below.

Examples of compound having two or more aziridine groups are shown below. TTMAP is trimethylolpropane tris (3-(2-methylaziridino)propionate) and commercially available from Aldrich Chemical, TTAP is trimethylolpropane tris(3-aziridinopropionate) and commercially available from Wako Pure Chemical, and PTAP is pentaerythritol tris(3-aziridinopropionate) and commercially available from Wako Pure Chemical.

TTMAP

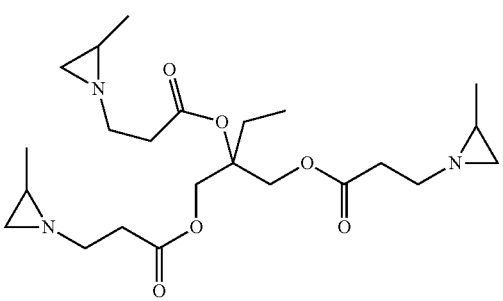

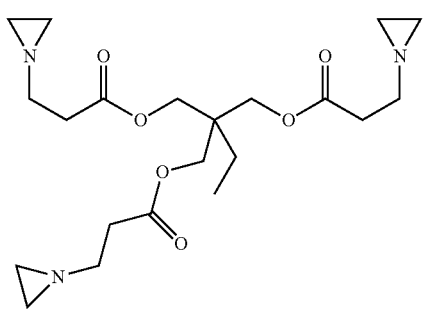

TTAP

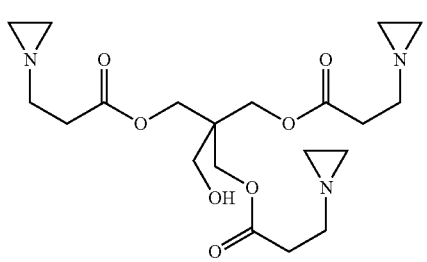

PTAP

Another example of producing an aziridine-containing polymer is reacting a polymer with a functional group other than the aziridine functional group of the aziridine-containing compound. For example, with the PTAP shown above, the hydroxyl functional group may be reacted with a polymer having a functional group such as isocyanate.

Another example of producing an aziridine-containing polymer is to treat the polymer with an aziridine-containing radically polymerizable monomer with ionizing radiation, such as electronic radiation, UV radiation, gamma rays or a combination. Below is one examples of an aziridine-containing monomer, where $R_1$ is H or $CH_3$, and $R_2$ is H or a $C_1$-$C_4$ alkyl group, and Z is 0, 1, or 2.

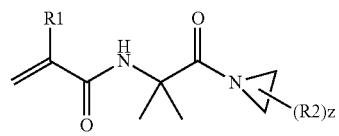

Below is another example of an aziridine-containing monomer, where $R_2$ is H or a $C_1$-$C_4$ alkyl group, and Z is 0, 1, or 2.

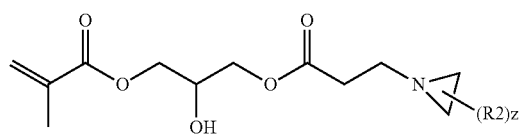

Specific examples of aziridine-containing monomers are shown below. Synthesis of these two monomers can be found in the Examples.

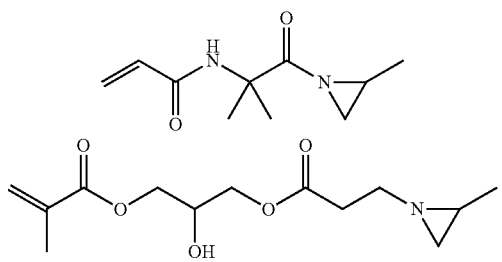

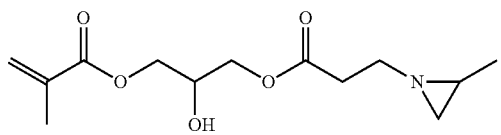

In another embodiment, the aziridine-containing component is entangled at a molecular level within the network of the polymer. An aziridine-containing monomer, such as shown below, is polymerized or copolymerized with another monomer in the presence of a polymer network, such as a polymeric fiber network, under suitable conditions such as ionizing radiation or heat.

Suitable aziridine-containing polymers, will be film-forming or fiber-forming polymers. Therefore, an article can be coated with an aziridine-containing polymer, or fibers can be made from an aziridine containing polymer. The fibers can be woven or knitted into an article or formed into a nonwoven article.

In another embodiment the reactive functional group is a hydroxyl functional group. Suitable hydroxyl-functional polymers include polysaccharides. Suitable polysaccharides include film-forming or fiber-forming polysaccharides such as rayon and cellulose. Cellulose can be from natural materials such as plant based fibers, material or pulp, which includes, but is not limited to cotton, linen, hemp, bamboo, soybean, wood materials. Suitable synthetic hydroxyl-functional polymers include poly(ethylene vinyl alcohol) copolymer (PEVOH), poly (propylene vinyl alcohol) copolymer (PPVOH), PVA (poly vinyl alcohol), PPA (polypropylene alcohol), and other co-polymers containing free hydroxyl groups.

In another embodiment, the polymer has an unsaturated functional group that can under go free radical polymerization wherein the functional group includes, but is not limited to, an alkene. In one embodiment, the unsaturated polymer is a film-forming or fiber-forming polymer. Suitable unsaturated polymers include, but are not limited to, 1,2-polybutadiene, 1,2-polyisoprene, KRATON D polymers, KRATON FG polymers, and KRATON IR polymers.

In another embodiment, the polymer includes an epoxy group. Epoxy groups readily react with nucleophiles, such as hydroxyl, carboxyl, amine groups.

In one embodiment, the polymer forms a substrate. A substrate is a solid support structure that provides a supporting structure for carrying, transporting, and exposing the color changing indicator to a surface. The substrate can be film, paper, fiber, or a woven, knitted or nonwoven article made from a fiber, foams, or sponges or a variety of combinations thereof so long as the substrate includes the reactive functional group for covalently bonding to the co-reactive functional group of the color changing indicator.

II. Color Changing Indicator and Co-Reactive Functional Group

The color changing indicator includes a co-reactive functional group, Z, that is capable of reacting and forming a covalent bond with the reactive functional group, Y, of the polymer (described above). The color changing indicator may inherently contain the co-reactive functional group, or may be functionalized to containing a co-reactive functional group. In either case, the color changing indicator, as bonded with the reactive group of the polymer, must maintain its ability to produce a color change.

One examples of a color changing indicator is ninhydrin. The ninhydrin is functionalized to include a co-reactive functional group, Z, which is capable of forming a covalent bond with a reactive functional group, Y, of the polymer. The functionalized ninhydrin is shown below.

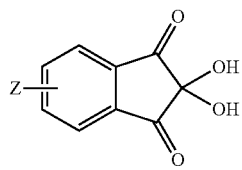

Suitable co-reactive functional groups, Z, include a hydroxyl group, a carboxylic acid, or an aliphatic alcohol group, all of which are capable of reacting with a hydroxyl reactive group or aziridine group of the polymer. Other suitable co-reactive functional groups include alkene, acrylate, methacrylate, alkyne for reacting with alkene, acrylate, methacrylate, alkyne reactive functional groups of the polymer.

In one embodiment, a linking group, $L_2$, positioned between the color changing indicator and the co-reactive functional group, Z. Suitable linking groups $L_2$ include, but are not limited to, aromatic groups, aliphatic carbon chain, and repeating ethylene glycol. The functionalized ninhydrin, including a linking group, $L_2$, and co-reactive function group, Z, is shown below.

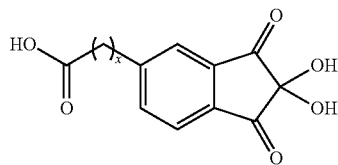

Shown below is an embodiment of a functionalized ninhydrin containing a carboxylic acid. In one embodiment, X is from 1 to 20. The carboxylic acid is bonded to the benzene ring of the ninhydrin molecule. Following bonding with the reactive group of the polymer, it is believed that longer chain carboxylic acids may provide more flexibility in getting adjacently bonded ninhydrin molecules to interact and achieve a faster reaction in the presence of the stimulus to form Ruhemann's Purple conjugate.

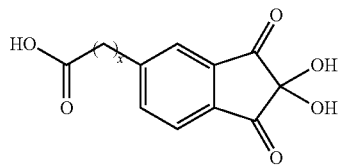

The ketal group (second carbon in the ninhydrin) is the portion of the ninhydrin reacting to form the conjugate Ruhemann's Purple. As such, placement of the co-reactive functional group for covalent bonding to the reactive functional group of the polymer at a position other than the location of C-2 ketal group is necessary to maintain the ability of the ninhydrin to produce a color change. Therefore, the co-reactive group and linking group, if included, are included on the benzene ring of the ninhydrin. Placement at this portion of the ninhydrin will not interfere with the ability of the ninhydrin to produce a color change in the presence of a stimulus. In particular, the co-reactive group and linking group, if included, are positioned at positions 5 or 6 of the benzene ring.

III. A Functional Polymer Having a Pendent Color Changing Indicator

The co-reactive group, Z, of the color changing indicator covalently bonds to the reactive group, Y, of the functional polymer to form the functional polymer with a pendant color changing indicator. Following bonding, the co-reactive functional group Z forms Z' as the bonded constituent to the reactive group of the polymer and the reactive functional group Y forms Y' as the bonded constituent to the reactive group of the polymer.

Shown below is an embodiment where the color changing indicator is ninhydrin. The co-reactive group Z' is shown generically positioned on the benzene ring. It is understood that the co-reactive group Z may be placed at positions 5 or 6 of the benzene ring. A linking group, $L_1$ (not shown) may be included between the polymer and the reactive functional group Y. A linking group, $L_2$ (not shown), may be included between the ninhydrin and the co-reactive group Z. Shown is a generic depiction of the polymer chain. It is understood than the polymer may include more than one bonded color changing indicator. It is understood that a variety of chemical structures may comprise the polymer.

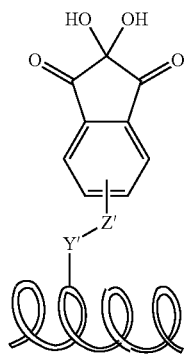

Shown below is an embodiment where the color changing indicator is fluorescein. The co-reactive group Z' is shown generically positioned on the benzene ring. It is understood that the co-reactive group Z may be placed at positions 5 or 6 of the benzene ring. A linking group, $L_1$ (not shown) may be included between the polymer and the reactive functional group Y. A linking group, $L_2$ (not shown), may be included between the ninhydrin and the co-reactive group Z. Shown is a generic depiction of the polymer chain. It is understood than the polymer may include more than one bonded color changing indicator. It is understood that a variety of chemical structures may comprise the polymer.

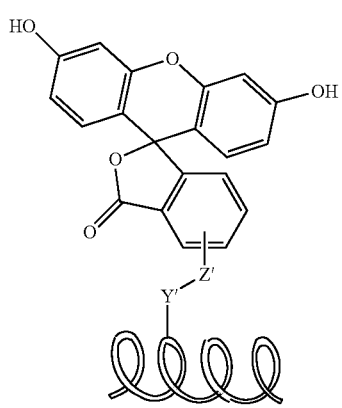

Following covalent bonding between the reactive group Y and the co-reactive group Z, the color-changing indicator maintains its ability to produce a color change in the presence of the stimulus. The co-reactive functional group should not inhibit the color changing indicators ability to produce a color change in the presence of a stimulus.

Below is shown one embodiment of a ninhydrin functional polymer, wherein the co-reactive group Z is depicted as Z' when bonded to the reactive functional group of the polymer. In this embodiment, the reactive functional group was an aziridine group, but is shown as an aziridine bonded to the co-reactive functional group. $R_1$ and $R_2$ are independently H or $C_1$-$C_4$ alkyl groups. An optional linking group $L_1$ is shown positioned between the polymer backbone and the aziridine. Although not shown, a linking group $L_2$ may be included between the bonded co-reactive functional group Z' and the ninhydrin molecule. The co-reactive bonded functional group Z' is shown generically positioned on the benzene ring. It is understood that the co-reactive bonded functional group Z' may be placed at positions 5 or 6 of the benzene ring. As discussed above, shown is a generic depiction of a polymer.

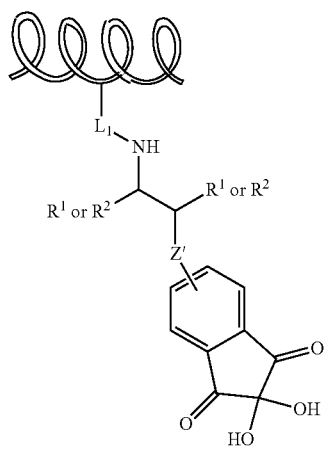

Below is shown an embodiment of a ninhydrin functional polymer, wherein the co-reactive group is a carboxylic acid, covalently bonded to a polymer that contained an aziridine group. $R_1$ and $R_2$ are independently H or $C_1$-$C_4$ alkyl groups. An optional linking group $L_1$ is shown positioned between the polymer backbone and the bonded aziridine. In one embodiment, x is from 1 to 20. The co-reactive bonded carboxylic acid group is shown generically positioned on the benzene ring. It is understood that the co-reactive carboxylic acid group may be placed at positions 5 or 6 of the benzene ring. As discussed above, it is believed that longer chain carboxylic acids may provide more flexibility in getting adjacently bonded ninhydrin to interact and achieve a faster reaction with stimulus to form Ruhemann's Purple conjugate. As discussed above, shown is a generic depiction of a polymer.

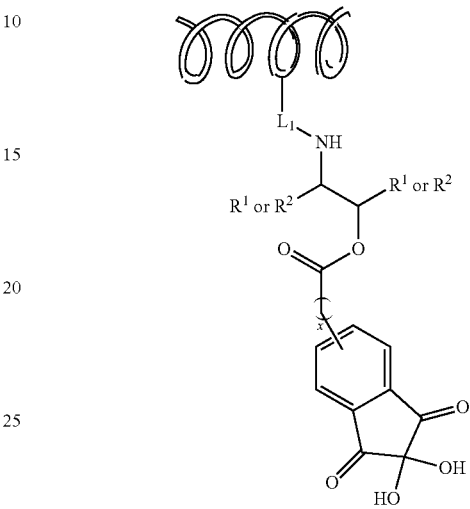

It is understood that not all of the reactive groups (hydroxyl, alkene, aziridine, epoxyl) of the polymer may react with the co-reactive functional group and that there may be remaining unreacted reactive groups.

The ninhydrin functionalized polymer, in the presence of the stimulus (protein, amine, amino acid, etc), is able to undergo the conjugation reaction to form the Ruhemann's Purple. In the presence of the stimulus, a visible color change occurs. The Ruhemann's Purple produces the color change while remaining chemically bonded to the polymer. Shown below are adjacent pendent ninhydrin molecules from an aziridine containing polymer and an optional linking group $L_1$ that have undergone the conjugation to form Ruhemann's Purple. $R_1$ and $R_2$ are independently H or $C_1$-$C_4$ alkyl groups. Although not shown, a linking group $L_2$ may be included between the bonded co-reactive functional group Z' and the ninhydrin molecule. It is understood that it may not be directly adjacent pendant ninhydrin molecules that conjugate to produce the color change in the presence of the stimulus.

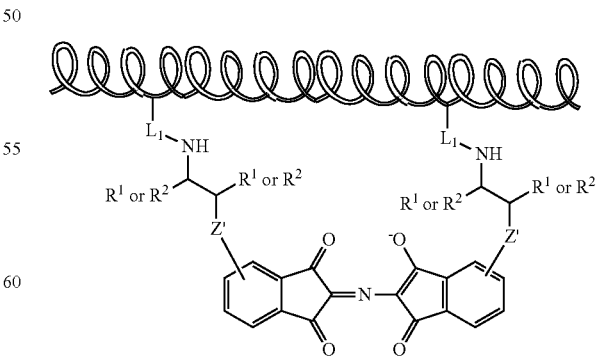

IV. Reactive Article

For polymers that form a substrate, such as film-forming or fiber-forming polymers, the co-reactive group of the color changing indicator covalently bonded to the reactive group of the polymer substrate produces a reactive article. For such a reactive article, the covalent bond formed between the reactive group of the polymer and the co-reactive group of the color changing indicator and the bond or entanglement between the reactive group and the polymer immobilizes the color changing securely to the substrate. In other words, following exposure to the stimulus and a color change being achieved, the color changing indicator remains secured to the polymer of the substrate and does not release from the polymer of the substrate to cause color staining on the surface containing the stimulus.

The reactive article may be a film, paper, foam, sponge, or woven, knitted or nonwoven article or fiber capable of being made into a woven, knitted, or nonwoven article. In one embodiment, the functionalized polymer with the pendant color changing indicator is processed into a fiber, which can then be used to make the reactive article, such as a woven, knitted or nonwoven fabric. U.S. Patent Application 60/966, 560, filed on Jun. 29, 2007 titled "An Indicating Fiber," the disclosure of which is herein incorporated by reference, discloses a variety of processing techniques for making fibers that may be suitable for processing the ninhydrin functionalized polymer into a fiber.

The reactive article may be a single layer structure or a multilayer structure, wherein one, some, or all of the layers contain the functional polymer having the pendent color changing indicator. It is not necessary that all layers include the functional polymer having the pendent color changing indicator. In addition, within a single layer, not all of the components of the substrate need to include the reactive group. For example, if hydroxyl or aziridine containing fibers are used to make a nonwoven article, other fibers such as thermoplastic fibers like polypropylene fibers may be intermixed with the hydroxyl containing fibers. The additional layers that do not contain the functional polymer having the pendent color changing indicator may comprise film, paper, foam, sponge, woven, knitted, or nonwoven materials. The additional layers may be absorbent, abrasive, scouring and/or strengthening layers. More than one color changing indicator may be pendant from a single polymer or from a single reactive article such that different color responses can be obtained upon exposure to difference stimuli.

One suitable substrate is a nonwoven made from a plurality of fibers. The fibers either inherently contain the reactive group or are modified to contain the reactive group. The fibers may be processed by known techniques to form a nonwoven web. The web may include resins, adhesives, abrasive particles, surfactants, oil so long as the bonded color changing indicator, including the co-reactive functional group, may be covalently bonded to the reactive functional group of the polymer and produce a color change upon exposure to the stimulus. In one embodiment, the nonwoven may be stiff and rigid for scouring and may include an abrasive. In another embodiment, the nonwoven is flexible and drapable and used for wiping.

In some embodiments, the substrate may be dry or wet loaded with soap, surfactant, perfumes, antibacterial, antifungal, antimicrobial, or a disinfectant. In a wet state, the substrate may be saturated with solutions of water, alcohols, detergents, surfactants, antibacterial, antifungal, antimicrobial, or disinfectants, or combinations thereof. Disinfectants may be particularly suitable for incorporation into a substrate intended for cleaning purposes. Common surface disinfectants comprise biocides such as alcohols, biguanides, cationic surfactants, and halogen or halogen containing compounds. Suitable alcohols include ethanol and isopropyl alcohol (IPA) 70% in water [IPA/$H_2O$ (70/30), EtOH/$H_2O$ (70/30)]. Suitable biguanides (chlorhexidine) include polyhexamethylene biguanide, p-chlorophenyl biguanide, and 4-chlorobenzhydryl biguanide. Commercially available biguanides are Nolvasan® available from Wyeth of Fort Dodge, Iowa and ChlorhexiDerm® Disinfectant available from DVM Pharmaceuticals of USA. Examples of cationic surfactant (Quaternary Ammonium Compounds, Quats) include Parvosol® available from Hess & Clark of Randolph, Wis., Roccal-D® Plus available from Pfizer of New York, N.Y., Unicide™ 256 available from Brulin & Company Inc. of Indianapolis, Ind., and benzalkonium chloride. Typical halogen or halogen containing compounds are either chlorine or iodine based.

In either a dry or wet loaded substrate, the additive should not adversely affect the chemical stability of the functionalized polymer or its ability to give a color change in the presence of the stimulus. The additive should not interfere with the ability of the color changing, including the co-reactive functional group, to covalently bond to the functional polymer.

The reactive article may be used in a variety of areas where a visible detection indicating the presence of a substance is desirable. Such applications include filtration, medical testing or diagnostic testing, or cleaning.

The functionalized polymer with the pendant color changing indicator chemically reacts in the presence of a stimulus to produce a visual color change. As discussed above, the stimulus will be associated with a particular contaminant. For example, ninhydrin reacts in the presence of a meat-based protein. Meat products such as beef can carry *E. coli* and chicken can carry *Salmonella*. Therefore, a color change from a ninhydrin functionalize polymer may indicate a meat is present and contaminations such as *E. coli* or *Salmonella* are present.

To use the reactive article, the reactive article is passed over a surface. If the surface is free of a stimulus capable of giving a color change, then no visual color change is apparent. Then, the user knows the surface is essentially free of that stimulus. The stimulus is associated with a particular contaminant. Therefore, the user knows the surface is essentially free of the associated contaminant.

If the surface includes the stimulus that is capable of giving a color-change with the color changing indicator, then a visual color change will appear. The user knows the surface includes the stimulus and the associated contaminant.

In the embodiment where the reactive article further includes a disinfectant, a wipe across the surface to detect a color change will also deliver a portion of the disinfectant. Therefore, upon seeing a color change some of the disinfectant will act upon the stimulus on the surface. The user may wipe the surface again with a new article to determine if the stimulus had been removed.

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

EXAMPLES

Fluorescein Functionalized Polymer

Fluorescein isothiocyanate can be reaction with β-alanine to form an alkylcarboxylic acid, which can be immobilized onto aziridine-treated non-woven. 111 Mg fluorescein (285 mmol), available from Aldrich Chemical, was dissolved in 2 mL amine-free DMF. 25 mg of β-alanine (280 mmol), available from Aldrich Chemical, was added to the solution, followed by DIEA (50 uL). The solution was kept in a brown vial away from the light. The reaction was stirred for 15 hours, and analyzed by HPLC.

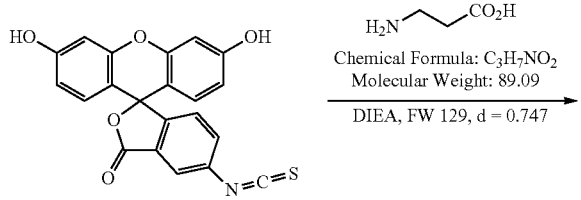

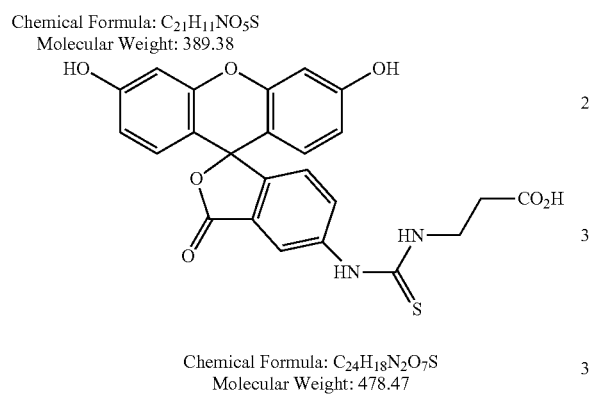

Non-woven containing pulp, bicompoent fiber, and latex (VI-ZORB-3026, from Buckeye), was e-beam treated with methylaziridine methacrylate (monomer 5, described below) using the e-beam procedure described below in Example 4. The e-beam treated nonwoven was immersed in the solution of the functionalized fluorescein, described above, for 10 min. The non-woven fiber was taken out of the solution, and was washed extensively with water and ethanol and then dried. Under UV light conditions the nonwoven web was fluorescing.

Synthesizing Functionalized Ninhydrin

Synthesis of 3-(3-Oxoindan-5-yl)propionic Acid, (Ninhydrin 2)

Finely divided p-phenylenedipropionic acid (4.44 g, 20.0 mmol, available from Aldrich Chemical, Milwaukee, Wis., Cat. 183768) was mixed with anhydrous aluminium chloride (13.3 g, 100 mmol) and sodium chloride (1.15 g, 20.0 mmol). The resulting mixture was added to a preheated flask (180° C.), and the reaction was stirred occasionally with a glass rod for 7 minutes. Another batch of aluminum chloride (13.3 g, 100 mmol) and sodium chloride (1.17 g, 20.0 mmol) was added and the reaction was stirred for an additional 8 minutes. After the flask was cooled to room temperature, the mixture was added to 500 g of ice and water (200 mL), and concentrated HCl (20 mL) was added to the solution. The product was extracted from the aqueous solution with dichloromethane (3×200 mL), and the combined organic layers were washed with saturated sodium bicarbonate (2×125 mL). The combined basic washes were acidified with 1 M HCl to give a yellow precipitate. The solid was collected via filtration and dryed under vacuum to yield ninhydrin 2 (shown below) as a yellow solid (2.48 g, 60%).

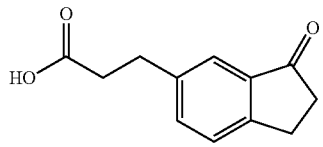

Synthesis of 3-(2,2-Dihydroxy-1,3-dioxoindan-5-yl)propionic Acid, (Ninhydrin 1)

A mixture of selenium dioxide (2.77 g, 25.0 mmol, Aldrich Chemical, Cat. 325473) and ninhydrin 2 (2.04 g, 10.0 mmol) was dissolved in glacial acetic acid (25 mL), and refluxed for 36 hours. The reaction was filtered through celite while still hot to remove a black precipitate. The precipitate was washed with glacial acetic acid (5 mL) and the filtrates were combined. The filtrates were diluted with water (100 mL). The aqueous solvent was extracted with ethyl acetate (5×100 mL). The organic layers were combined, and solvent removed under vacuum to yield oil. The pure product, ninhydrin 1 (shown below), was obtained via recrystallization in water (500 mg, 20%).

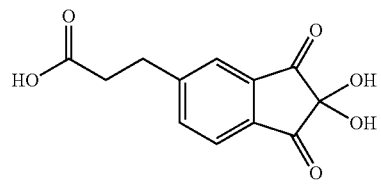

Synthesis of Aziridine-Containing Monomer

Synthesis of N-[1,1-dimethyl-2-(2-methyl-aziridin-1-yl)-2-oxo-ethyl]acrylamide (4)

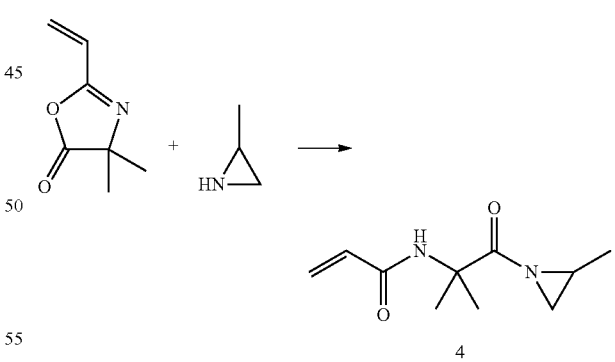

To a stirred solution of vinyldimethyl azlactone (13.9 g, 0.10 mol, available from TCI Chemical, cat. D2123) in 50 mL of a 30/70 (volume/volume) mixture of ethyl acetate and hexane was added 2-methylaziridine (7.6 g, about 0.12 mol, 90% pure, available from Aldrich, cat. 294160) rapidly dropwise. The reaction mixture was stirred overnight and a white solid was present. The solid was filtered off, washed with 50 mL of hexane, and dried to provide the desired product (17.4 g). NMR and IR spectral analyses confirmed the structure of the product.

Synthesis of 2-Methylacrylic acid 2-hydroxy-3-[3-(2-methylaziridin-1-yl)propionyloxy]propyl ester (5)

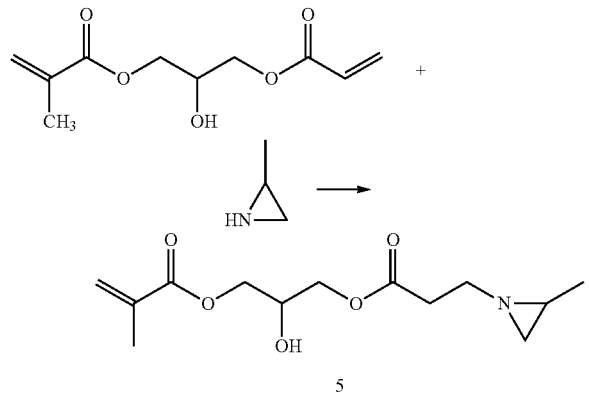

To a 250 mL round bottomed flask were added 3-(acryloyloxy)-2-hydroxypropyl methacrylate (32.1 g, 0.15 mol, available from Aldrich, cat. 454982) and 2-methylaziridine (10.8 g, about 0.17 mol, 90% pure, available from Aldrich). The reaction flask was cooled briefly in an ice bath and then allowed to stand at room temperature overnight. Excess 2-methylaziridine was removed at reduced pressure to leave the desired product (40.4 g) as a colorless liquid. NMR and IR spectral analyses confirmed the structure of the product.

Preparation of Polymer Containing a Pendant Color Changing Indicator

Example 1

Treatment of Polymer Using Compound Having Multiple Aziridine Groups

Non-woven containing pulp, bicompoent fiber, and latex (VIZORB-3026, from Buckeye), was immersed in a solution of TTAP (trimethylolpropane tris(3-aziridinopropionate), available from Wako Pure Chemical) in methanol (0.1 M) for 1 hr. The non-woven was then air dried for 10-15 minutes and was then immersed in a solution of ninhydrin compound 1 (above) in methanol (0.1M) for 1 hr. The treated non-woven was air dried for 10-15 minutes and was washed in methanol and air dried.

Example 2

Treatment of Polymer Using Compound Having Multiple Aziridine Groups

Non-woven carded polyester web (SF-110, from Rogers Corp.), was immersed in a solution of pentaerythritol tris(3-aziridinopropionate) available from Wako Pure Chemical in tetrahydrofuran (0.1 M). The non-woven was then immersed in a solution of ninhydrin compound 1 (above) in tetrahydrofuran (0.1 M), and dried.

Example 3

Treatment of Polymer Using Compound Having Multiple Aziridine Groups

Non-woven carded-powder polyester web (B9260, available from HDK), was immersed in a solution of pentaerythritol tris(3-aziridinopropionate) available from Wako Pure Chemical in tetrahydrofuran (0.1 M). The non-woven was then immersed in a solution of ninhydrin compound 1 (above) in tetrahydrofuran (0.1 M), and dried.

Example 4

Treatment of Polymer Using Aziridine-Containing Radically Polymerizable Monomer 5 Under E-Beam Radiation Condition Electron beam irradiation was carried out using a Model CB-300 electron beam system, obtained from Energy Sciences, Inc., Wilmington, Mass. Samples of nonwoven were placed between two larger area size pieces of 4-mil thick poly(ethylene terephthalate) film (PET) and taped together at one end. This sandwich was then opened and the sample nonwoven was wetted with methylaziridine methacrylate solution and the sandwich reclosed. Trapped air bubbles were removed and excess liquid was squeezed out by gently applying a rubber roller over the surface of the sandwich. The sandwich was taped to a moving web of PET and conveyed through the electron beam processor at a speed of 20 fpm and at a voltage of 300 keV with sufficient beam current applied to the cathode to deliver the targeted dose. The beam was calibrated using thin film dosimeters, calibrated and traceable to a national standards laboratory (RISO, Denmark). In some cases, to lower the overall dose rate and increase residence time while under the beam, the dose was fractionated by multiple passes through the beam to simulate a longer exposure time more characteristic of electron beams with cathodes extended in the web direction (i.e. BroadBeam, etc). The targeted dose was 40 kGy.

Non-woven (VIZORB 3036, available from Buckeye) was treated with methylaziridine methacrylate (above referenced as monomer 5) (0.1 M in methanol). The non-woven was then washed with isopropanol (100 mL×3) and was air dried. The dried non-woven was then immersed in a solution of ninhydrin compound 1 (above) in methanol (0.1 M) for 1 hr. The treated non-woven was air dried for 10-15 minutes and was washed in methanol and air dried.

Example 5

Ninhydrin Bonded to a Rayon Substrate Via Esterification

Ninhydrin 1 (1 g, 4 mmol) was dissolved in in N,N-dimethylformamide (2 mL) with diisopropylethyl amine (1.4 mL, 8 mmol) and dicyclohexylcarbodiimide (0.82 g, 4 mmol). The resulting solution was added to Rayon cellulose (0.72 g). The reaction was stirred for 4 hours, and the Rayon was washed with N,N-dimethylformamide (3×10 mL) and dried under vacuum.

Comparative Example

Treatment of Polymer Using Compound Having Multiple Aziridine Groups without Functionalized Color Changing Indicator Non-woven carded-powder polyester web (B9260, available from HDK), was immersed in a solution of pentaerythritol tris(3-aziridinopropionate) in tetrahydrofuran (0.1 M). The non-woven was then immersed in a solution of ninhydrin in tetrahydrofuran (0.1 M), and dried.

Color Change Test Method

To the dried, treated nonwoven web, a 50 µL of 10% (w/w) aqueous solution of bovine serum albumin (Pierce Biotechnology, Inc of Rockford, Ill.) was added. The time to a visually discernable color change was measured.

Color Changing Indicator Immobilization Test Method

Following a fully developed color change, as described in the color change test method, the nonwoven was immersed in a water or methanol solution for 24 hours. After 24 hours, the nonwoven was removed from the solution. A visual determination was made to evaluate any color change found in the water or methanol.

| Example | Color Change Test (time) | Color Changing Indicator Immobilization Test |
|---|---|---|
| Example 1 | Less than 5 minutes to full color change | Minimal color transfer remaining in aqueous solution |
| Example 2 | Over 12 hours to full color change | Minimal color transfer remaining in methanol solution |
| Example 3 | One hour to full color change | Minimal color transfer remaining in methanol solution |
| Example 4 | Less than 5 minutes to full color change | Minimal color transfer remaining in aqueous solution |
| Example 5 | No apparent color change occurred | N/A |
| Comparative Example | Color change after one hour | Color transfer to methanol solution briefly after submersion |

What is claimed is:

1. A functional polymer comprising the reaction product of a base polymer having one or more pendant reactive group selected from the group consisting of aziridine, epoxy, hydroxyl, and alkene groups, and a functionalized ninhydrin color changing indicator with a co-reactive group, wherein the reactive group covalently bonds to the co-reactive group, and the functionalized ninhydrin color changing indicator produces a color change in response to a protein.

2. The functional polymer of claim 1, wherein the pendant reactive group is covalently bonded to the base polymer.

3. The functional polymer of claim 1, wherein the co-reactive group of the functionalized ninhydrin color changing indicator is selected from the group consisting of hydroxyl, carboxyl, aliphatic alcohol, alkene, acrylate, methacrylate, and alkyne groups able to covalently bond with the reactive group.

4. The functional polymer of claim 1, further comprising a linking group positioned between the functionalized ninhydrin color changing indicator and the co-reactive group positioned between the base polymer arid the reactive group.

5. The functional polymer of claim 4, wherein the linking group is selected from the group consisting of aromatic groups, aliphatic carbon chains, and repeating ethylene glycol.

6. The functional polymer of claim 1, wherein the base polymer is film-forming or fiber-forming synthetic polymer.

7. The functional polymer of claim 1, comprising:

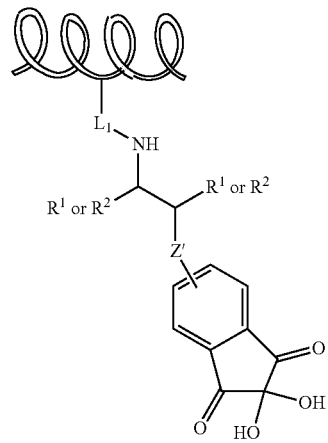

wherein the base polymer,

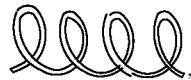

includes an optional linking group, $L_t$, wherein $R^1$ is H or C1-C4 alkyl groups;

wherein $R^1$ is H or C1-C4 alkyl groups;

wherein $Z'$ is the co-reactive group bonded.

8. A functional polymer comprising the reaction product of a base polymer having one or more pendant reactive group and a functionalized ninhydrin color changing indicator with a co-reactive group at position 5 or 6 of the benzene ring of the ninhydrin, wherein the reactive group covalently bonds to the co-reactive group, and the functionalized ninhydrin color changing indicator produces a color change in response to a protein.

9. The functional polymer of claim 8, wherein the pendant reactive group is covalently bonded to the base polymer.

10. The functional polymer of claim 8, wherein the co-reactive group of the functionalized ninhydrin color changing indicator is selected from the group consisting of hydroxyl, carboxyl, aliphatic alcohol, alkene, acrylate, methacrylate, and alkyne groups able to covalently bond with the reactive group.

11. The functional polymer of claim 8, further comprising a linking group positioned between the functionalized ninhydrin color changing indicator and the co-reactive group positioned between the base polymer and the reactive group.

12. The functional polymer of claim 11, wherein the linking group is selected from the group consisting of aromatic groups, aliphatic carbon chains, and repeating ethylene glycol.

13. The functional polymer of claim 8, wherein the base polymer is film-forming or fiber-forming synthetic polymer.

14. The functional polymer of claim 8, comprising:

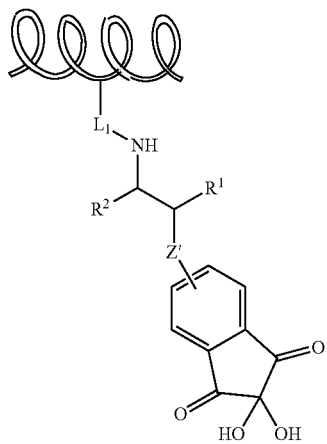

wherein the base polymer,

includes an optional linking group, $L_t$;
wherein $R^1$ is H or C1-C4 alkyl groups;
wherein $R^2$ is H or C1-C4 alkyl groups;
wherein Z' is the co-reactive group bonded.

15. A functional polymer comprising the reaction product of a base polymer having, one or more pendant reactive group and a functionalized ninhydrin color changing indicator with a co-reactive group, wherein:
the reactive group covalently bonds to the co-reactive group;
the functional polymer comprises

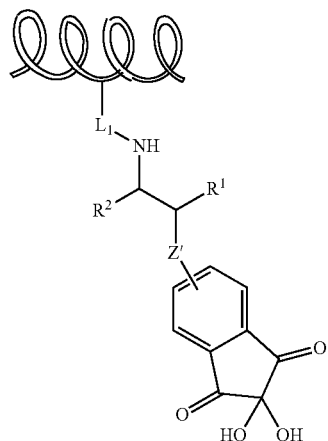

wherein the base polymer,

includes an optional linking group, $L_t$;
wherein $R^1$ is H or C1-C4 alkyl groups;
wherein $R^2$ is H or C1-C4 alkyl groups;
wherein Z' is the co-reactive group bonded; and
the functionalized ninhydrin color changing indicator produces a color change in response to a protein.

16. The functional polymer of claim 15, wherein the pendant reactive group is covalently bonded to the base polymer.

17. The functional polymer of claim 15, wherein the co-reactive group of the functionalized ninhydrin color changing indicator is selected from group consisting of hydroxyl, carboxyl, aliphatic alcohol, alkene., acrylate, methacrylate, and alkyne groups able to covalently bond with the reactive group.

18. The functional polymer of claim 15, wherein the linking group is selected from the group consisting of aromatic groups, aliphatic carbon chains, and repeating ethylene glycol.

19. The functional polymer of claim 15, wherein the base polymer is film-forming or fiber-forming synthetic polymer.

20. An article comprising a polymeric fiber network entangled with a functional polymer having a pendant aziridine group, the functional polymer comprising the reaction product of a base polymer having one or more pendant reactive group and a functonalized ninhydrin color changing indicator with a co-reactive group, wherein the pendant reactive group covalently bonds to the co-reactive group, and the functonalized ninhydrin color changing indicator produces a color change in response to a protein.

* * * * *

UNITED STATES PATENT AND TRADEMARK OFFICE
CERTIFICATE OF CORRECTION

PATENT NO. : 8,329,851 B2
APPLICATION NO. : 12/666796
DATED : December 11, 2012
INVENTOR(S) : Yifan Zhang Page 1 of 2

It is certified that error appears in the above-identified patent and that said Letters Patent is hereby corrected as shown below:

Column 7,
Lines 42-47, delete

"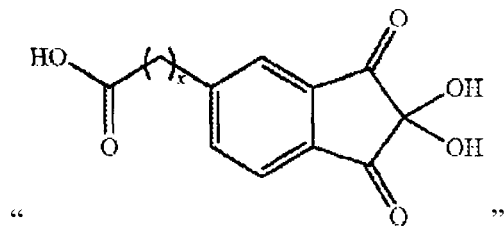"

and insert

-- 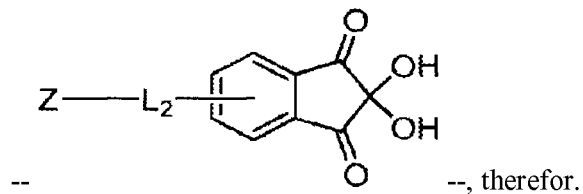 --, therefor.

Column 17,
Line 40, in Claim 4, delete "arid" and insert -- and --, therefor.

Signed and Sealed this
Nineteenth Day of March, 2013

Teresa Stanek Rea
*Acting Director of the United States Patent and Trademark Office*

CERTIFICATE OF CORRECTION (continued)
U.S. Pat. No. 8,329,851 B2

Column 17,
Line 50-65, in Claim 7 delete

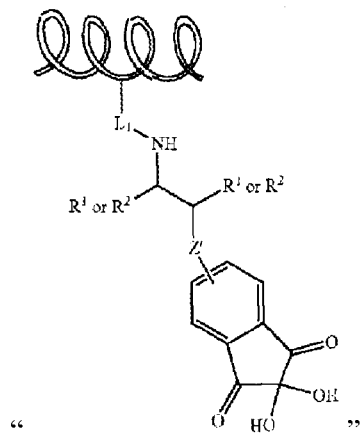

" " and insert

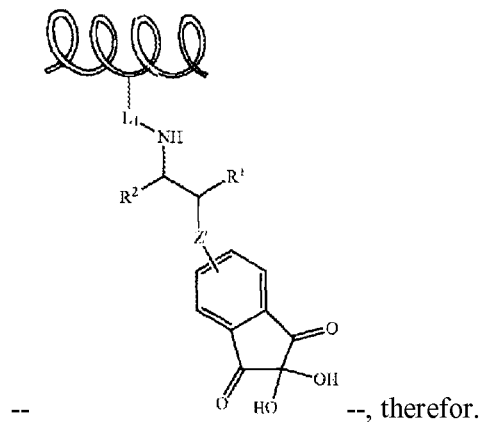

-- --, therefor.

Column 18,
Line 13, in Claim 7, delete "$L_t$" and insert -- $L_1$; --, therefor.
Line 15, in Claim 7, delete "$R^1$" and insert -- $R^2$ --, therefor.

Column 19,
Line 8, in Claim 14, delete "$L_t$;" and insert -- $L_1$; --, therefor.
Line 14, in Claim 15, delete "having," and insert -- having --, therefor.

Column 20,
Line 8, in Claim 15, delete "$L_t$;" and insert -- $L_1$; --, therefor.
Line 19, in Claim 17, delete "from" and insert -- from the --, therefor.
Line 20, in Claim 17, delete "alkene.," and insert -- alkene, --, therefor.
Line 32, in Claim 20, delete "functonalized" and insert -- functionalized --, therefor.
Line 35, in Claim 20, delete "functonalized" and insert -- functionalized --, therefor.